United States Patent [19]
Warren

[11] Patent Number: 5,493,998
[45] Date of Patent: Feb. 27, 1996

[54] PET FEED BOWL ARRANGEMENT

[76] Inventor: Dean P. Warren, 255 Boundry Blvd. #104, Totonda West, Fla. 33947

[21] Appl. No.: 238,513

[22] Filed: May 5, 1994

[51] Int. Cl.$^6$ .................................................. A01K 5/01
[52] U.S. Cl. .................................................. 119/61
[58] Field of Search .................................. 119/51.5, 61

[56] References Cited

U.S. PATENT DOCUMENTS

| | | | |
|---|---|---|---|
| D. 244,948 | 7/1977 | Foley et al. | D30/16 |
| D. 299,771 | 2/1989 | Kennedy | D30/130 |
| 2,918,372 | 3/1960 | Farley | 119/61 |
| 3,441,003 | 4/1969 | Du Mond et al. | 119/61 |
| 3,611,998 | 10/1971 | Loscalzo | 119/61 |
| 4,576,118 | 3/1986 | Meadows | 119/62 |
| 4,716,855 | 1/1988 | Andersson et al. | 119/61 |
| 5,133,293 | 7/1992 | Boozer | 119/61 |

FOREIGN PATENT DOCUMENTS 2610789  8/1988  France ................. 119/61

Primary Examiner—Robert P. Swiatek

[57] ABSTRACT

A pet feed bowl arrangement including a circular base web, with a feed bowl mounted centrally of the base web, whereby an animal consuming the contents of the feed bowl will stand on the base web to preclude movement of the bowl relative to the animal. The base web includes first and second rows of perforations directed through the base web intersecting at a perforation junction at a perimeter of the base web, such that the web may be selectively fractured along the perforations to conform the web to the shape of a fiat wall or a corner.

4 Claims, 2 Drawing Sheets

PET FEED BOWL ARRANGEMENT

BACKGROUND OF THE INVENTION

1. Field of the Invention

The field of invention relates to feed bowl structure, and more particularly pertains to a new pet feed bowl arrangement wherein the same includes a circular base web, with a feed bowl mounted centrally of the base web, whereby an animal consuming the contents of the feed bowl will stand on the base web to preclude movement of the bowl relative to the animal.

2. Description of the Prior Art

Feed bowls typically are of a generally circular or arcuate configuration, wherein the employment by pets of a feed bowl permits the pets to push the bowl around resulting in spillage and the like relative to the feed bowl. Prior art feed bowls are exemplified in the U.S. Pat. Nos. 4,576,118; 3,611,998; and 3,441,003.

The instant invention attempts to overcome deficiencies of the prior art by employing a circular base web, with a feed bowl mounted centrally of the base web, whereby an animal consuming the contents of the feed bowl will stand on the base web to preclude movement of the bowl relative to the animal, and in this respect, the present invention substantially fulfills this need.

SUMMARY OF THE INVENTION

In view of the disadvantages inherent in the known types of feed bowl arrangement now present in the prior art, the present invention provides a pet feed bowl arrangement wherein the same includes a plurality of side walls, wherein at least two of the side walls are orthogonally intersecting relative to one another. As such, the general purpose of the present invention, which will be described subsequently in greater detail, is to provide a new pet feed bowl arrangement apparatus and method which has many of the advantages of the prior art listed heretofore and many novel features that result in a pet feed bowl arrangement apparatus which is not anticipated, rendered obvious, suggested, or even implied by any of the prior art, either alone or in any combination thereof.

To attain this, the present invention provides a pet feed bowl arrangement including a circular base web, with a feed bowl mounted centrally of the base web, whereby an animal consuming the contents of the feed bowl will stand on the base web to preclude movement of the bowl relative to the animal. The base web includes first and second rows of perforations directed through the base web intersecting at a perforation junction at a perimeter of the base web, such that the web may be selectively fractured along the perforations to conform the web to the shape of a fiat wall or a corner.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new pet feed bowl arrangement apparatus and method which has many of the advantages of the prior art listed heretofore and many novel features that result in a pet feed bowl arrangement apparatus which is not anticipated, rendered obvious, suggested, or even implied by any of the prior art, either alone or in any combination thereof.

It is another object of the present invention to provide a new pet feed bowl arrangement which may be easily and efficiently manufactured and marketed.

It is a further object of the present invention to provide a new pet feed bowl arrangement which is of a durable and reliable construction.

An even further object of the present invention is to provide a new pet feed bowl arrangement which is susceptible of a low cost of manufacture with regard to both materials and labor, and which accordingly is then susceptible of low prices of sale to the consuming public, thereby making such pet feed bowl arrangements economically available to the buying public.

Still yet another object of the present invention is to provide a new pet feed bowl arrangement which provides in the apparatuses and methods of the prior art some of the advantages thereof, while simultaneously overcoming some of the disadvantages normally associated therewith.

Even still yet another object of the present invention is to provide a new pet feed bowl arrangement including a circular base web, with a feed bowl mounted centrally of the base web, whereby an animal consuming the contents of the feed bowl will stand on the base web to preclude movement of the bowl relative to the animal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
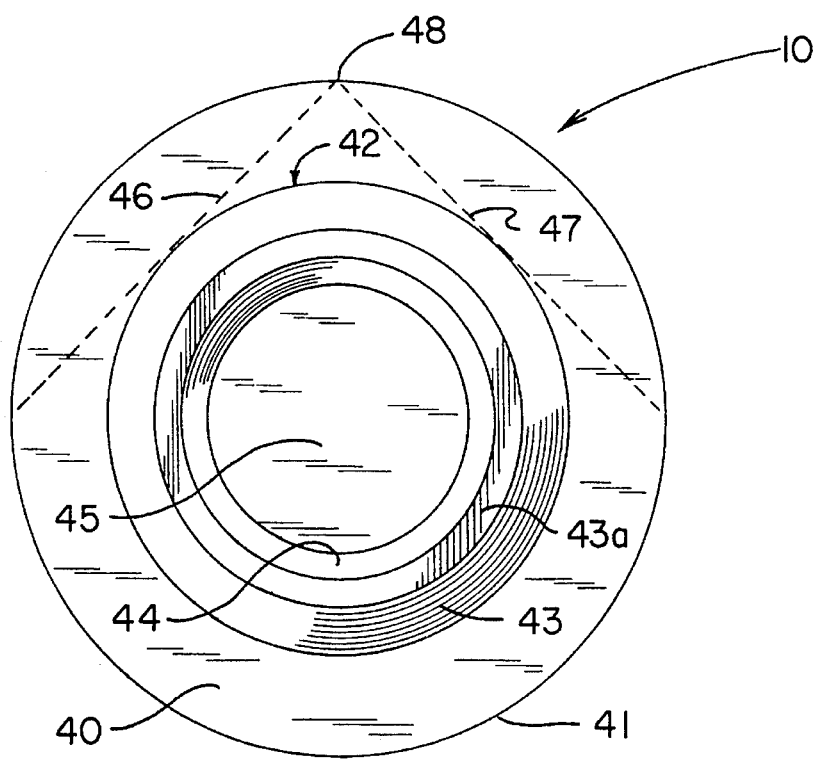
FIG. 1 is an orthographic top view of the invention.

With reference now to the drawings, and in particular to FIGS. 1–4 thereof, a new pet feed bowl arrangement embodying the principles and concepts of the present invention and generally designated by the reference numeral 10 will be described.

Figure 2:
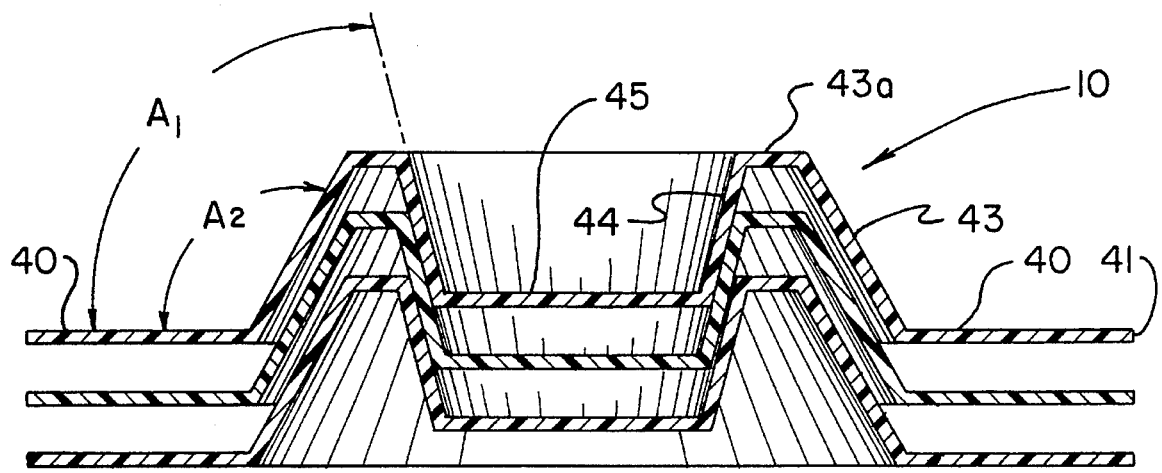
FIG. 2 is an orthographic cross sectional view, illustrating the nesting capability of the present invention.

More specifically, the pet feed bowl arrangement 10 of the instant invention comprises a substantially circular base web 40 having an annular perimeter 41, with a central bowl 42 integrally mounted medially of the base web 40, whereby an animal consuming food or water positioned within the bowl will stand on the base web and preclude movement of the bowl relative to the animal. The central bowl 42 includes an outer wall 43 arranged at an obtuse included angle relative to the web which extends upward and connects with an annular top wall 43a, with an inner wall 44 extending from the top wall to a floor 45 spaced above the base web 40. Because the outer wall 43 is arranged at an obtuse included angle "A2" relative to the base web 40 and the inner wall 44 is arranged at an acute included angle "A1" relative to the base web, the device 10 may be nested with other similarly constructed feed bowl arrangements, as illustrated in FIG. 2.

Figure 3:
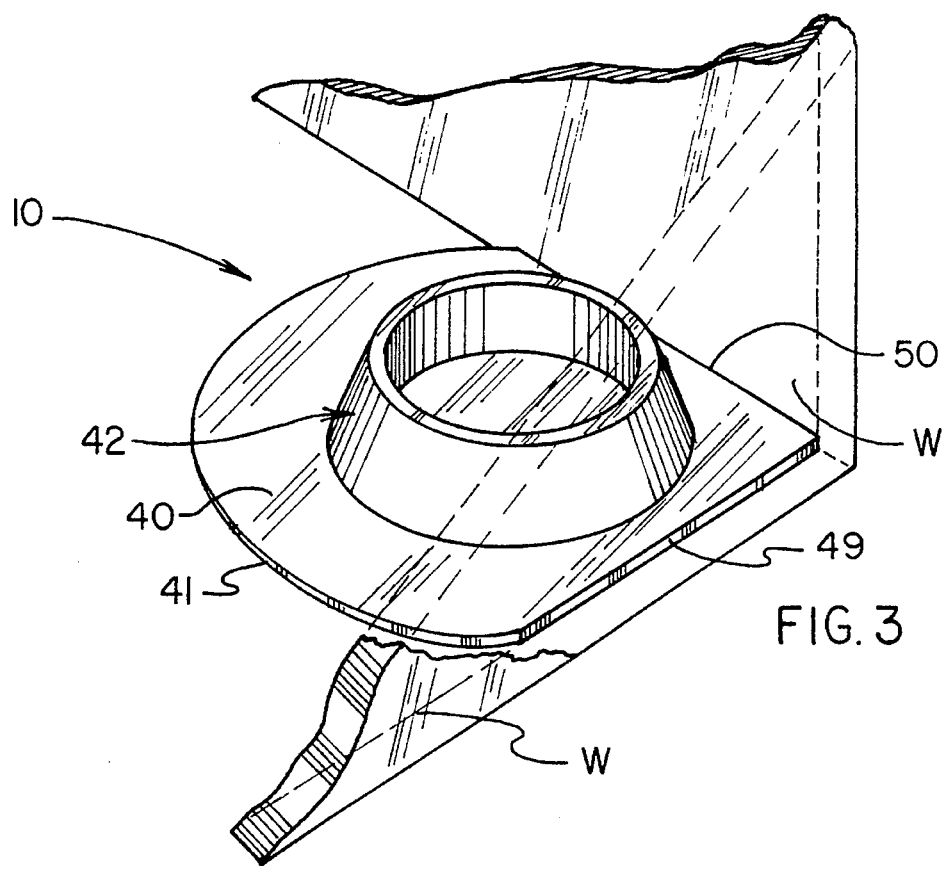
FIG. 3 is an isometric illustration of the invention mounted at an intersection of two wall portions.
Figure 4:
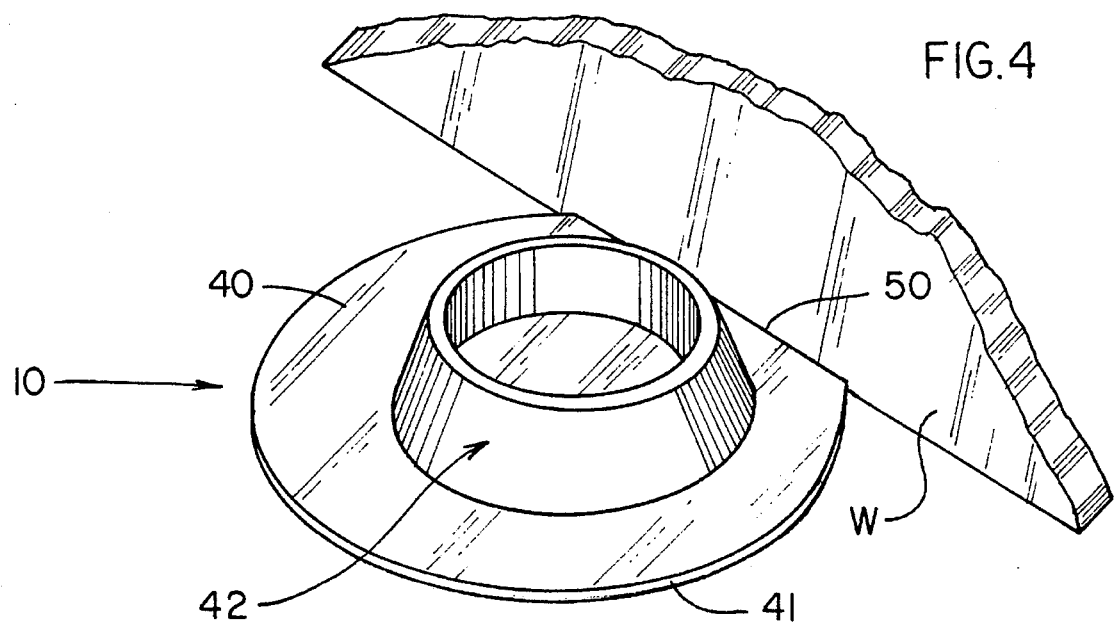
FIG. 4 is an isometric illustration of the invention mounted against an individual wall portion within a dwelling.

As shown in FIG. 1, the base web 40 includes first and second respective rows of perforations 46 and 47 directed through the base web intersecting at a perforation junction 48 at the perimeter 41. The first and second rows 46 and 47 intersect at an orthogonal angle, such that separation of the base web along the first and second rows defines first and second row side walls 49 and 50 permitting positioning of the structure within a corner of orthogonally intersecting walls "W", such as indicated in FIG. 3. Alternatively, removal of an individual row of perforations permits case of mounting of the structure relative to an individual wall "W", as shown in FIG. 4.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A pet feed bowl arrangement comprising:

a substantially circular base web having an annular perimeter;

a bowl integrally mounted centrally of the base web, the central bowl including an outer wall arranged at an obtuse included angle relative to the base web, the outer wall extending upward to connect with an annular top wall, and an inner wall extending from the top wall to a floor spaced above the base web, whereby an animal consuming food positioned within the bowl will stand on the base web and preclude movement of the feed bowl arrangement relative to the animal, wherein the inner wall is arranged at an acute included angle relative to the base web, such that the pet feed bowl arrangement can be nested with another similarly constructed pet feed bowl arrangement;

and further wherein the base web includes first and second rows of perforations directed through the base web and intersecting at a perforation junction at the perimeter, with the first and second rows intersecting at an orthogonal angle, such that fracturing of the base web along the first and second rows defines first and second row side walls permitting positioning of the structure within a corner of orthogonally intersecting walls.

2. An arrangement as set forth in claim 1, wherein the inner wall is arranged at an acute included angle relative to the base web, such that the pet feed bowl arrangement can be nested with another similarly constructed pet feed bowl arrangement.

3. A pet feed bowl arrangement comprising:

a substantially circular base web having an annular perimeter;

a bowl integrally mounted centrally of the base web, the central bowl including an outer wall arranged at an obtuse included angle relative to the base web, the outer wall extending upward to connect with an annular top wall, and an inner wall extending from the top wall to a floor spaced above the base web, whereby an animal consuming food positioned within the bowl will stand on the base web and preclude movement of the feed bowl arrangement relative to the animal, wherein the inner wall is arranged at an acute included angle relative to the base web, such that the pet feed bowl arrangement can be nested with another similarly constructed pet feed bowl arrangement;

and further wherein the base web includes a row of perforations directed through the base web such that fracturing of the base web along the row defines a straight row side wall permitting positioning of the row wide wall of the base web into an abutting relationship with a planar wall.

4. An arrangement as set forth in claim 3 wherein the inner wall is arranged at an acute included angle relative to the base web, such that the pet feed bowl arrangement can be nested with another similarly constructed pet feed bowl arrangement.

\* \* \* \* \*